United States Patent [19]
Kielsmeier et al.

[11] 3,713,220
[45] Jan. 30, 1973

[54] APPARATUS FOR MIXING CHEESE CURD

[75] Inventors: Lester O. Kielsmeier, Wheatridge; James G. Leprino, Gosden, both of Colo.

[73] Assignee: Leprino Cheese Mfg. Co., Denver, Colo.

[22] Filed: July 13, 1970

[21] Appl. No.: 54,515

Related U.S. Application Data

[60] Division of Ser. No. 775,980, Oct. 7, 1968, Pat. No. 3,531,297, which is a continuation-in-part of Ser. No. 643,372, June 5, 1967, abandoned.

[52] U.S. Cl. ...................................... 99/459, 99/116
[51] Int. Cl. .............................................. A01j 25/11
[58] Field of Search .............. 31/46, 89; 99/116, 243

[56] References Cited

UNITED STATES PATENTS

| | | | |
|---|---|---|---|
| 2,917,827 | 12/1959 | Lankford | 31/46 |
| 2,840,909 | 7/1958 | Dzenis | 31/46 |
| 3,445,241 | 5/1969 | Pontecorvo et al. | 99/116 |
| 3,468,026 | 9/1969 | Robertson et al. | 31/89 |
| 2,768,572 | 10/1956 | Drangle | 99/243 |
| 3,193,927 | 7/1965 | Ubbels et al. | 31/46 |

*Primary Examiner*—Aldrich F. Medbery
*Attorney*—Dawson, Tilton, Fallon and Lungmus

[57] ABSTRACT

An apparatus for mixing cheese curd in contact with heated water includes an elongated auger unit which extends through a feed hopper for the curd, a water tank, and a cylindrical jacket or tube. The hopper and water tank are filled with heated water, and the auger conveys curd from the hopper through the water tank as the curd is mixed and stretched by the auger. The curd is compressed against the auger by an inclined deflector plate in the tank, the curd is further compressed as it passes into the cylindrical tube. Additional compression and mixing is caused by a restricting plate at the end of the tube which restricts the outflow of the curd thereby creating back pressure in the tube. The curd is prevented from turning with the auger by a longitudinally extending baffle on the deflector plate and longitudinally extending baffles which extend radially inwardly from the tube. Control means are provided for maintaining the water at the desired temperature while the curd is being mixed.

13 Claims, 6 Drawing Figures

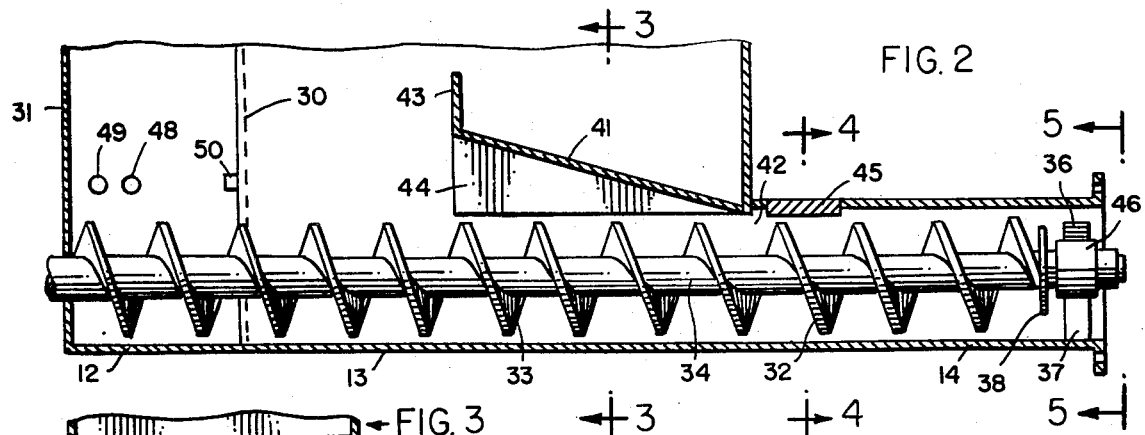
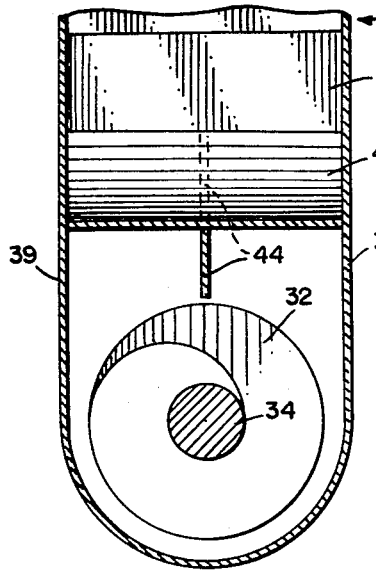
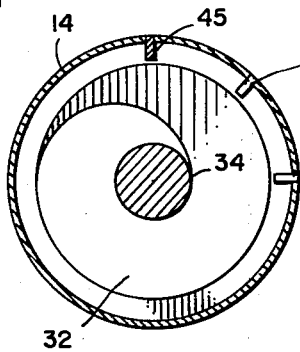
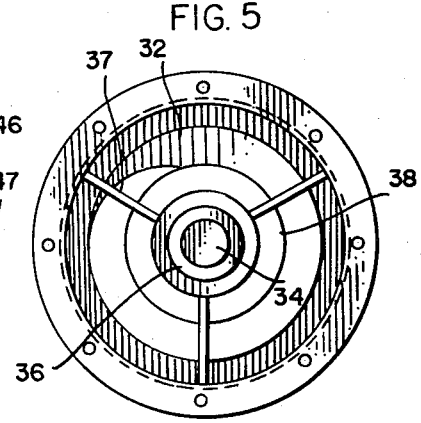
FIG. 2
FIG. 3
FIG. 4
FIG. 5
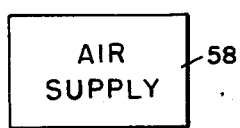
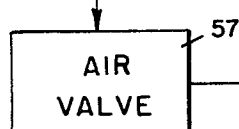
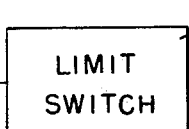
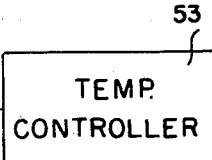
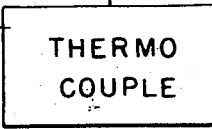
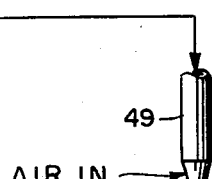
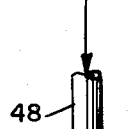
FIG. 6
INVENTORS:
LESTER O. KIELSMEIER
JAMES G. LEPINO
BY: Dawson, Tilton, Fallon & Lungmus
ATT'YS

APPARATUS FOR MIXING CHEESE CURD

RELATED APPLICATIONS

This application is a division/continuation-in-part of our co-pending application entitled "Manufacture of Pastafilata Cheese", Ser. No. 775,980, filed Oct. 7, 1968, now U.S. Pat. No. 3,531,297, which in turn was a continuation-in-part of application Ser. No. 643,372, filed June 5, 1967, and now abandoned.

BACKGROUND

In recent years, Pasta-filata cheese suitable for use in making Pizza has been produced in very large quantities in the United States. Such cheeses may be technically classified as Mozzarella, Provolone, or Scamorze cheeses, but they are more generically termed Pasta filata or "Pizza" cheeses. The conventional process for preparing cheese of this general type is well known in the art. It is described in detail in Reinbold, *Italian Cheese Varieties*, Vol. 1, Pfizer Cheese Monographs (1963). A description of the conventional process for preparing this type of cheese is also found in our said co-pending application, Ser. No. 775,980, now U.S. Pat. No. 3,531,297, to which reference may be had for details.

After cooking, the curd is subjected to stirring, dipping, piling and milling prior to the "pulling" operation in which the cheese is mixed and stretched at an elevated temperature in the presence of water. Conventionally, the milled curd particles are introduced into a stainless steel mixing bowl or into a sanitary mill mixing machine, and water is added at about 180°F. Pieces are worked in the water until they become smooth, elastic and free from lumps. This may require the use of additional hot water and considerable effort by hand. Stretching or mixing must be thorough and "marbling" in the finished product may be associated with incomplete mixing, too-low water temperature, or low-acidity curd, or a combination of these defects.

SUMMARY

The invention permits the steps of mixing or stretching the curd to be formed continuously and automatically, the hot plastic cheese being fed thereafter to a conventional molding machine. The suspension of the soaked curd in the water bath is pumped over a separator screen, such as a shaker screen or a rotating screen, and the curd is separated and concentrated. The curd is delivered to a feed hopper containing water maintained at a temperature within the plastic temperature range of the curd. With the inventive apparatus, the required temperature can be lower than in the prior art practice for mixing and stretching Pasta-filata curd, such as a temperature of 135°-150°F., preferably about 135°-145°F. While temperatures up to 180°-190°F. can be used, the lower temperatures are preferred and have been found to improve the quality and uniformity of the product.

The curd is conveyed by an auger from the feed hopper to a water tank which is also filled with the heated water, and an inclined deflector plate compresses the curd as it is moved forwardly by the auger. The auger extends through the water tank into a cylindrical jacket, and a restricting plate is mounted on the auger shaft at the end of the cylindrical jacket. As the curd is conveyed along by the auger, it is mixed and stretched, and as the curd moves into the confined zone provided by the cylindrical jacket, it is subjected to superatmospheric pressure, the curd particles being compressed together to form a continuous plastic mass. The pressure within the jacket is increased by the restricting plate, which limits the flow of curd out of the jacket. Baffles mounted on the inclined deflector plate and the wall of the jacket prevent the curd from turning with the auger, and the curd is continuously formed into a plastic mass ready for molding the curd mass being conveyed from the cylindrical jacket to a molding unit.

DESCRIPTION OF THE DRAWING

The invention will be explained in conjunction with an illustrative embodiment shown in the accompanying drawing in which

FIG. 2 is a longitudinal fragmentary sectional view of the apparatus of FIG. 1;

FIG. 3 is a sectional view taken along the line 3—3 of FIG. 2;

FIG. 4 is a sectional view taken along the line 4—4 of FIG. 2;

FIG. 5 is an end view of the apparatus as would be seen along the line 5—5 of FIG. 2; and FIG. 6 is a diagrammatic showing of the temperature control means.

DETAILED DESCRIPTION

Figure 1:
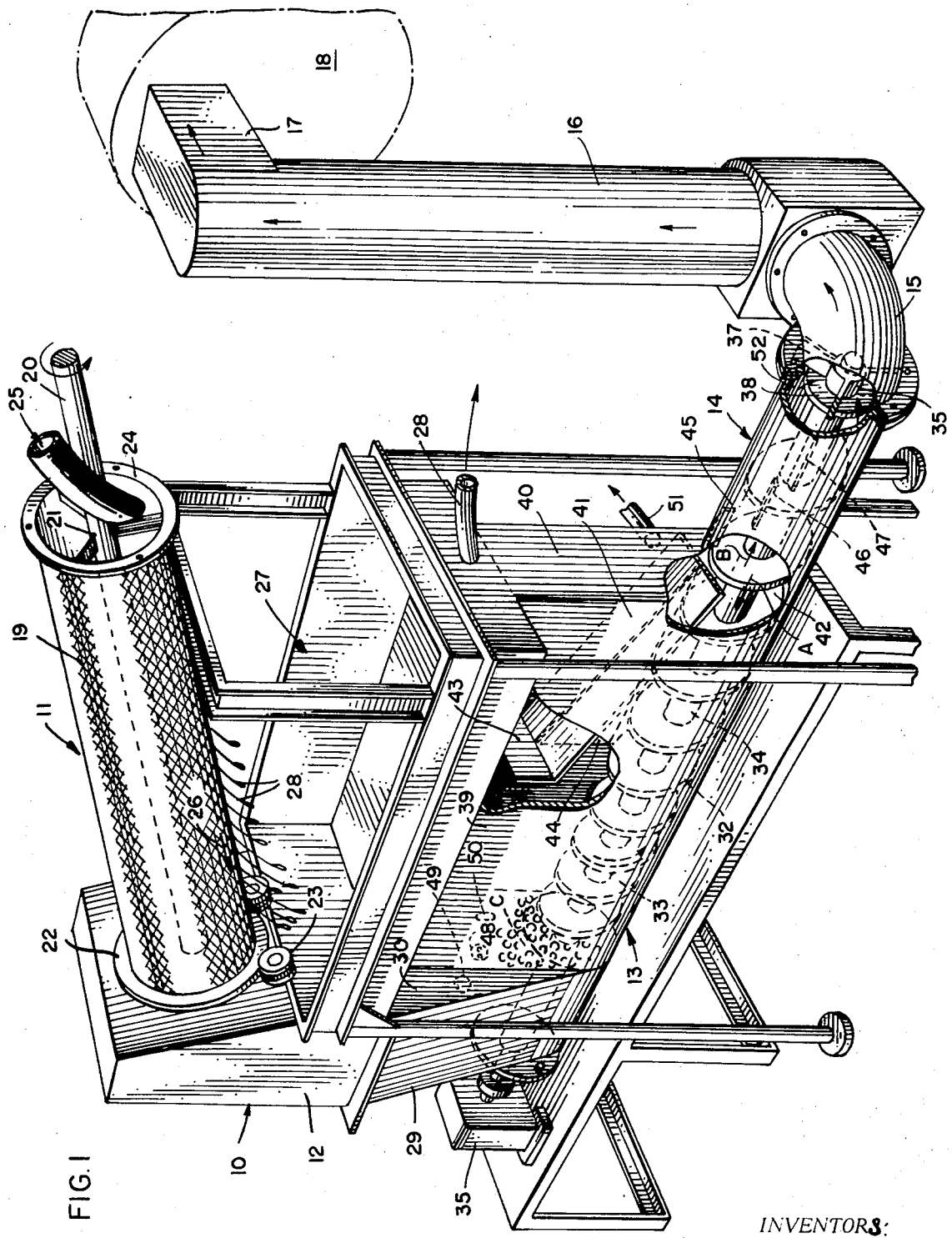
FIG. 1 is a perspective view of an apparatus formed in accordance with the invention.

The apparatus has found particular utility in the process of making Pasta-Filata cheese which is described in our prior application entitled "Manufacture of Pasta-filata Cheese," Ser. No. 775,980, filed Oct. 7, 1968. Briefly, the process described in that application includes the steps of a. cooking a mixture of curd and whey, b. separating the whey to obtain cooked, drained particles, c. immersing the drained curd in a water soaking bath while the curd is developing acidity, d. extracting lactose from the curd into the water bath while continuing to soak the curd to reduce the internal pH of the curd, e. separating the curd from most of the water of the bath, f. heating the curd particles by contact with heated water to a temperature in the plastic temperature range of the curd while mixing and stretching under super-atmospheric pressure while pressing the mixed curd through a restricted back-pressure creating outlet, whereby a plastic curd mass is obtained having a typical Pasta filata stringiness. Thereafter the curd may be delivered to a conventional cheese molding machine.

The inventive apparatus is capable of performing the steps described in paragraphs (e) through (f) above. It is to be understood, however, that the apparatus may be used in other manufacturing processes.

Referring now to FIG. 1, the numeral 10 designates a cheese mixing and stretching apparatus which includes a separator screen 11, a curd feed hopper 12, a water tank 13, and a cylindrical outlet tube or jacket 14. The separator screen 11 receives cooked curd which has been separated from the whey and which may be delivered from the water soak tanks. The mixed and stretched cheese is delivered from the tube 14 through an elbow section 15, vertical pipe 16 and discharge head 17 to a conventional cheese molding unit 18.

The separator screen 11 includes a mesh cylinder 19 which is mounted for rotation on a central shaft 20 by means of spider supports 21 encased in each end of the mesh cylinder. The outward extension of shaft 20 is driven by a motor through a gear reducer drive (not shown). The forward end of the mesh cylinder terminates in a trunnion or peripheral flange 22 which is supported for rotation by rollers 23, and the rearward end of the cylinder includes trunnion 24 which is also suitably supported for rotation.

The water-soaked curd is delivered from the soak tanks to the separator screen by feed hose 25. The separator screen is seen to be supported at an angle of about 45°, and as the screen rotates, the curd moves downwardly along the lower portion thereof, as indicated by the arrow 26, while the water and any remaining whey drains through into the open top of pan 27 as indicated as at 28. As the partially drained curd reaches the lower or forward end of the separator screen, it is discharged into the top of the feed hopper 12.

The lower portion of the feed hopper includes downwardly converging, inclined side walls 29, a front wall 30 and a rear wall 31. An elongated auger 32 extends through the feed hopper 12, water tank 13, and tube 14 and includes a mixing and conveying spiral or screw element 33 mounted on a shaft 34 which is rotated by variable speed motor 35. The forward end of the auger is supported for rotation by a nylon bushing 36 which is mounted centrally within the tube 14 at the forward end thereof by spider support 37. The other end of the auger is also supported by suitable bearings, and a suitable seal, for example a carbon disc liquid seal, is provided where the auger enters the feed hopper 12. A restricting or back pressure plate 38 is located on the forward end of the shaft 34 near the bushing 36. The plate can be stationary, being attached to the bushing, or it can be mounted on the shaft 34 for rotation therewith.

The water tank 13 includes vertically extending sidewalls 39 which extend forwardly from the front wall 30 of the feed hopper and a vertical front wall 40. An inclined deflector plate 41 extends angularly upwardly and rearwardly between the sidewalls 39 from an auger opening 42 provided in the lower portion of the front wall 40 and terminates in an upwardly openly extending overflow dam 43. The deflector plate 41 extends at an angle of about 30° to about 40° from the horizontal, and a triangularly shaped baffle plate 44 extends vertically downwardly from the center of the deflector plate toward the screw element 33 of the auger. A series of longitudinally extending baffles 45, 46 and 47 are provided in longitudinally and circumferentially spaced relation along the tube 14 and extend radially inwardly from the inner wall of the tube toward the screw element.

In one particular embodiment of the apparatus, the diameter of the screw element of the auger within the feed hopper and water tank was about 6 inches, and the diameter of this element was reduced to about 5 inches within the tube 14, had an inside diameter of about 6¼ inches. The baffle plate 44 was formed of ¼ inch stainless steel sheet which was welded to the deflector plate 41 and the baffle plate extended downwardly to about ¼ inch above the screw element. The baffles 45–47 were each about 10 inches long and were arranged along the axis of the tube 14 so that at least one radially extending baffle appears in a vertical cross-section of the tube taken anywhere along substantially the entire length of the tube. However, more or less baffles may be provided in the tube as desired. For example, a single baffle extending longitudinally for substantially the entire length of the tube could be used. For ease of assembly, the baffles 45–47 were formed of ¼ inch thick steel strips which were inserted through slots formed in the wall of the tube and welded in place. The baffles 45–47 extended inwardly from the inner wall of the tube about ¼ inch, or about ¼ inch from the screw. The back-pressure plate 38 was formed of nylon and had a diameter of 4½ inches.

Water within the feed hopper 12 and tank 13 is maintained at the desired temperature by live steam which is introduced into the hopper 12 through steam jet 48 and air which is introduced into the feed hopper through air jet 49. As will be explained more fully hereinafter, the steam jet 48 and air jet 49 which extend through one of the side walls 29 of the hopper, are controlled by a thermocouple or temperature sensing element 50 located on the front wall of the hopper.

In operation the feed hopper and water tank are filled with heated water to the level of the overflow dam 43, which maintains the water level constant. Excess water overflows the dam and the upper side of the deflector plate 41 and is discharged to waste through an outlet 51.

The relatively drained curd is delivered by the separator screen 11 and drops into the water in the feed hopper 12. The curd C in the bottom of the feed hopper is moved forwardly by the rotating auger, and as the curd moves into the relatively confined area between the sidewalls 39 of the water tank, it begins to settle on the auger. The compression of the curd along the auger is facilitated by the deflector plate 41 as the curd is moved forwardly by the auger. The curd is forced to move ahead with the auger rather than merely rotating with the auger by the triangular baffle plate 44 which is supported adjacent the screw element by the deflector plate.

As the curd is conveyed along by the auger element, it is mixed and stretched, and as the curd is moved into the confined zone provided by the tube or jacket 14 it is subjected to super-atmospheric pressure and the curd particles are compressed together to form a continuous plastic mass. Considerable pressure within the tube is provided by the back-pressure or restricting plate 38 which provides a restrictive annular outlet 52 between the plate and the wall of the tube. Because of this restrictive annular outlet, back-flow of curd can occur along the periphery of the enclosed space, as indicated by the arrow A in FIG. 1, while the main mass is carried forwardly, as indicated by the arrow B, and this back-flow thoroughly mixes and stretches the curd. The mixing under pressure within the zone of the tube 14 is a most important part of the mixing process, and the curd should be at a temperature at which it can be formed into a plastic mass under the applied pressure. Because of the pressure within the jacket 14, curd temperatures as low as 130°-150°F. can be used, whereas in prior practice with an open mixer, temperatures as high as 180°-190°F. were required to form the plastic mass. The mixed and compressed curd is forced out from the confined zone of the tube 14 through the restricted, back-pressure creating outlet 52 in a plastic mass ready for molding. This plastic mass is conveyed through elbow 15 and tube 16 into a conventional cheese molding unit 18.

The baffles 45–47 provided along the length of the tube 14 function in a manner similar to the baffle 44 and prevent the curd from rotating with the auger while the auger turns. This insures that the curd is moved ahead by the auger rather than merely rotating with the auger.

The water in the feed hopper and water tank is maintained at a temperature within the plastic temperature range of the curd. With the inventive apparatus, the required temperature can be lower than in the prior art practice while mixing and stretching Pasta-filata curd, such as a temperature 135°-145°F. The temperature is controlled by the thermocouple 50 which is operatively connected to a temperature controller 53 (FIG. 6) which in turn actuates a plunger valve 54. The plunger valve 54 is interposed between a source of live steam 55 and the steam jet 48, and the amount of steam injected into the feed hopper through the steam jet is controlled by the plunger valve. The steam not only maintains the desired temperature, but the condensed steam adds to the liquid volume and dilutes any residual whey which is introduced with the curd to the hopper.

Under certain conditions, for example, when one batch of cheese is being cleaned from the machine prior to the start of another batch, there will be no curd moving through the machine. At this time, the temperature controller may actually fully close the plunger valve so that no steam is being introduced to the hopper. However, it is important to maintain the water at the desired temperature uniformly throughout the apparatus so that when curd is again introduced into the hopper the curd will not be cooled too much before the sensing element again activates the steam jet. We provide means for maintaining a uniform water temperature in the form of the air jet 49 and the controls associated therewith. Referring to FIG. 6, when the plunger valve becomes fully closed, limit switch 56 is activated to open an air valve 57 which is interposed between a source of air 58 and the air jet 49. The air which is introduced into the hopper circulates the water past the thermocouple 50, and insures that the temperature of the water is substantially uniform throughout the apparatus. When the temperature falls below the desired level, the thermocouple opens the plunger valve 54, thereby closing the limit switch 56 and air valve 57 while introducing steam through steam jet 48.

If curd is introduced into the hopper when the steam jet is closed, there will be air passing into the hopper through the air jet. This will cause the curd to begin circulating immediately in the water, and the curd and water will immediately begin circulating past the temperature sensing element.

Although we have described our apparatus with reference to the cheese manufacturing process described in our said prior application, it will be understood that the apparatus can be used for mixing and stretching curd which has been processed by other methods.

While in the foregoing specification we have described a specific embodiment of our invention in considerable detail for the purpose of illustration, it is to be understood that many of the details hereingiven can be varied considerably by those skilled in the art without departing from the spirit and scope of the invention.

We claim:

1. An apparatus for use in the manufacture of Pasta filata cheese by a process wherein the curd after separation from the whey is soaked in a water bath, comprising means for substantially separating the curd from water, means for heating said curd in direct contact with water to the plastic temperature range of said curd, means for mixing said heated curd in a confined zone under pressure at a temperature in said plastic temperature range of said curd, and means for forcing the mixed curd from said confined zone, including a restricted back-pressure creating outlet, whereby said curd is formed into a plastic mass ready for molding.

2. The apparatus of claim 1 in which heating means is provided in conjunction with said mixing means, said heating means being adapted to maintain said curd at a temperature in the range from about 130° to about 150°F. while it is being mixed.

3. The apparatus of claim 1 in which the mixing means includes an elongated auger and means for rotating the auger.

4. The apparatus of claim 1 in which the mixing means includes a water tank and a tube extending from the water tank which provide the confined zone, an elongated auger extending through the water tank and tube, and means for rotating the auger.

5. The apparatus of claim 4 in which said water tank contains water at a temperature in the range of about 130°F. to about 150°F. and means for maintaining the temperature of the water within said range.

6. The apparatus of claim 4 including a disc mounted within the tube, the tube being generally cylindrical and having an inside diameter greater than the diameter of the disc for providing the restricted back-pressure creating outlet.

7. An apparatus for mixing cheese curd in contact with heated water comprising a water tank for containing the heated water, means for delivering curd to the tank, a tube extending from the tank, auger means rotatably mounted within the tank and the tube for conveying the curd therethrough while mixing the curd, means for rotating the auger, and a restricting plate mounted within the tube whereby a restricted back-pressure creating outlet is provided between the plate and the wall of the tube.

8. An apparatus for mixing cheese curd in contact with heated water comprising a water tank for containing the heated water, means for delivering curd to the tank, a tube extending from the tank auger means rotatably mounted within the tank and the tube for conveying the curd therethrough while mixing the curd, means for rotating the auger, the water tank including side walls extending upwardly adjacent the auger means to provide a relatively confined zone in the tank through which the auger extends, and deflector plate means mounted within the water tank between the side walls thereof and above the auger means, the deflector plate means being positioned between the curd delivery means and the tube, whereby the curd is compressed toward the auger means as the curd is advanced toward the tube.

9. The apparatus of claim 8 in which the deflector plate means comprises an inclined plate extending upwardly and away from adjacent the area at which the tube extends from the tank.

10. An apparatus for mixing cheese curd in contact with heated water comprising a water tank for containing the heated water, means for delivering curd to the tank, a tube extending from the tank, auger means rotatably mounted within the tank and the tube for conveying thecurd therethrough while mixing the curd, means for rotating the auger, and baffle means mounted within the tank adjacent the auger means for substantially preventing rotation of the curd within the auger means.

11. An apparatus for mixing cheese curd in contact with heated water comprising a water tank for containing the heated water, means for delivering curd to the tank, a tube extending from the tank, auger means rotatably mounted within the tank and the tube for conveying the curd therethrough while mixing the curd, and means for rotating the auger, heating means for maintaining the temperature of the water at a predetermined level, the heating means including steam inlet means for introducing steam into the water and temperature sensing and control means operatively associated with the steam inlet means, and air inlet means for introducing air into the water, the air inlet means being operatively associated with temperature sensing and control means whereby air is introduced into the water when steam is not being introduced into the water.

12. The apparatus of claim 11 in which the tube is generally cylindrical and has an inside diameter slightly greater than the diameter of the auger means whereby a pressure-creating confined zone is provided by the tube.

13. The apparatus of claim 11 in which the water tank includes side walls extending upwardly adjacent the auger means to provide a relatively confined zone in the tank through which the auger extends.

* * * * *